April 25, 1961   C. JOHNSON   2,981,100
FORCE MEASURING INSTRUMENT
Filed Dec. 12, 1956   4 Sheets-Sheet 1
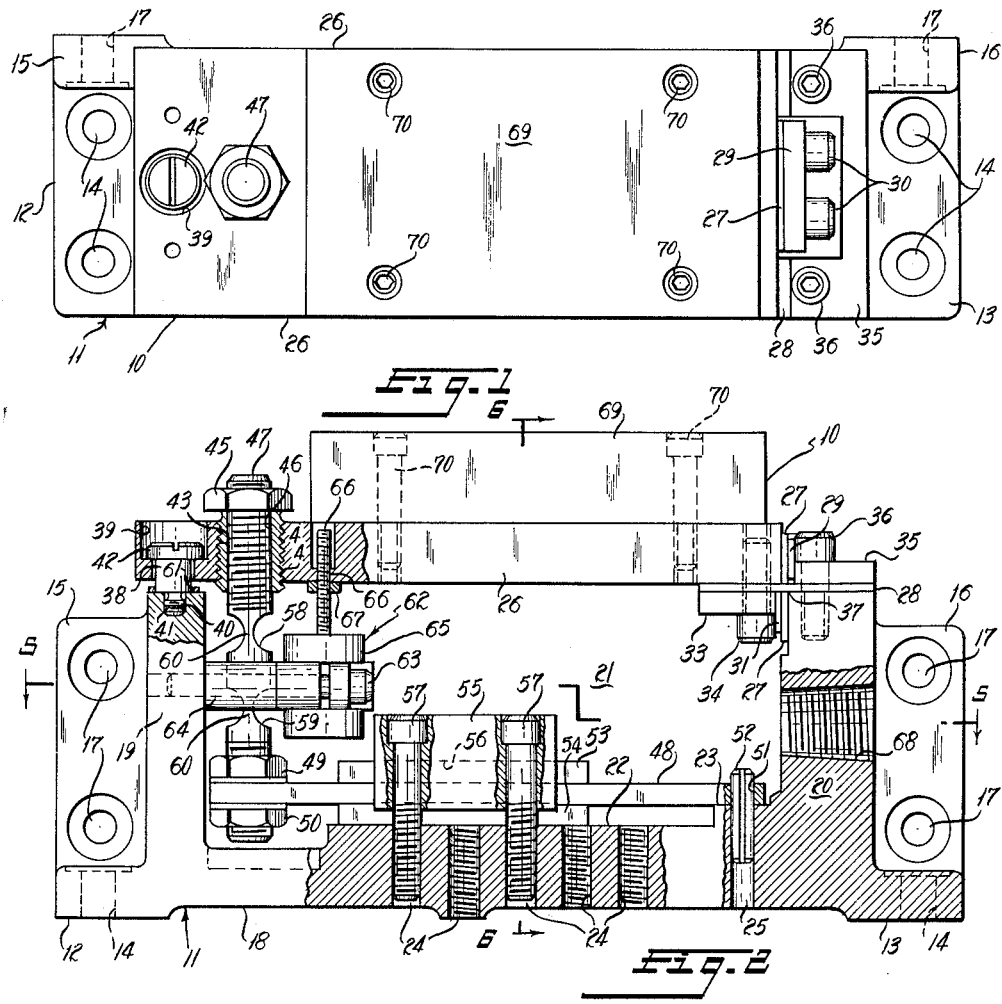
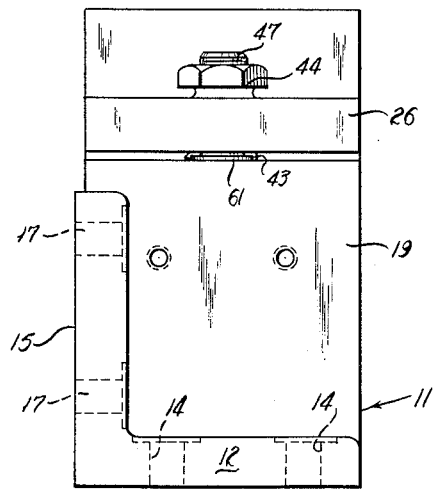
INVENTOR
CLARENCE JOHNSON
BY
ATTORNEYS April 25, 1961  C. JOHNSON  2,981,100
FORCE MEASURING INSTRUMENT
Filed Dec. 12, 1956  4 Sheets-Sheet 2
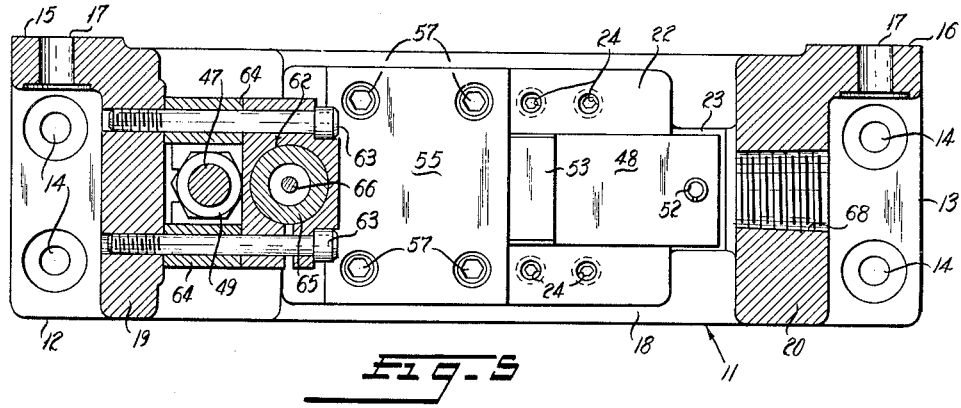
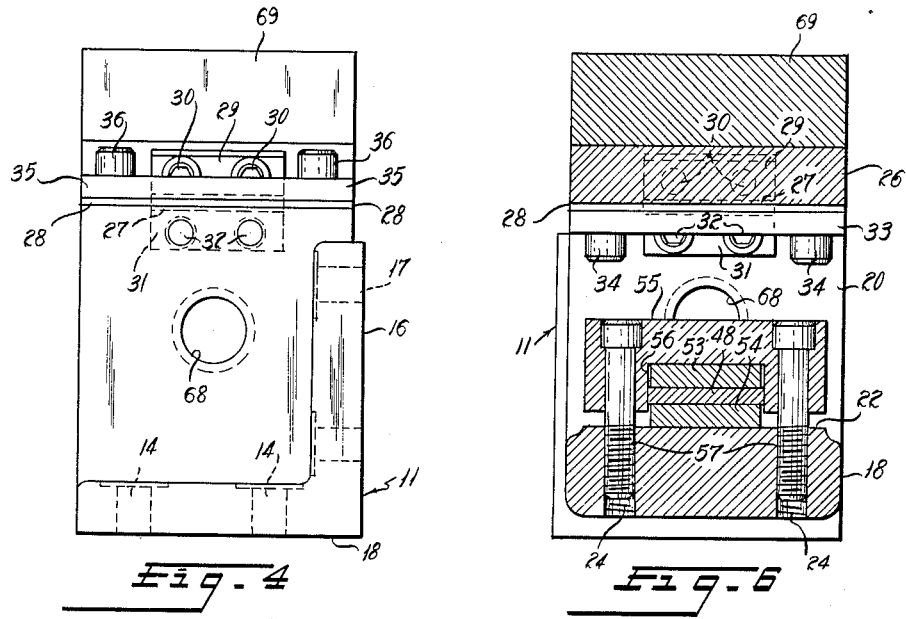
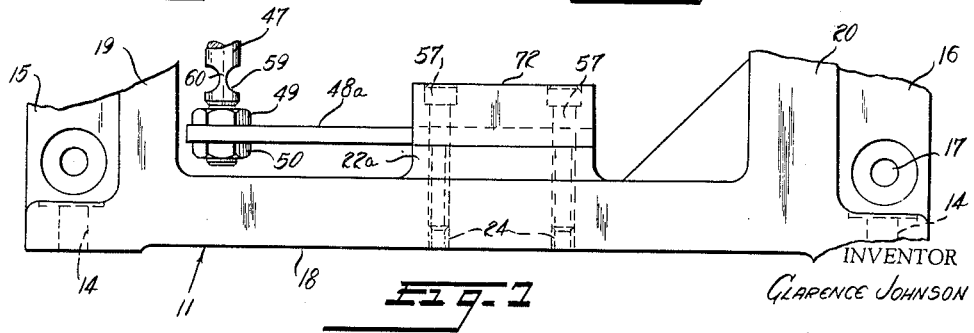
INVENTOR
CLARENCE JOHNSON
BY
Strauch, Nolan & Neale
ATTORNEYS

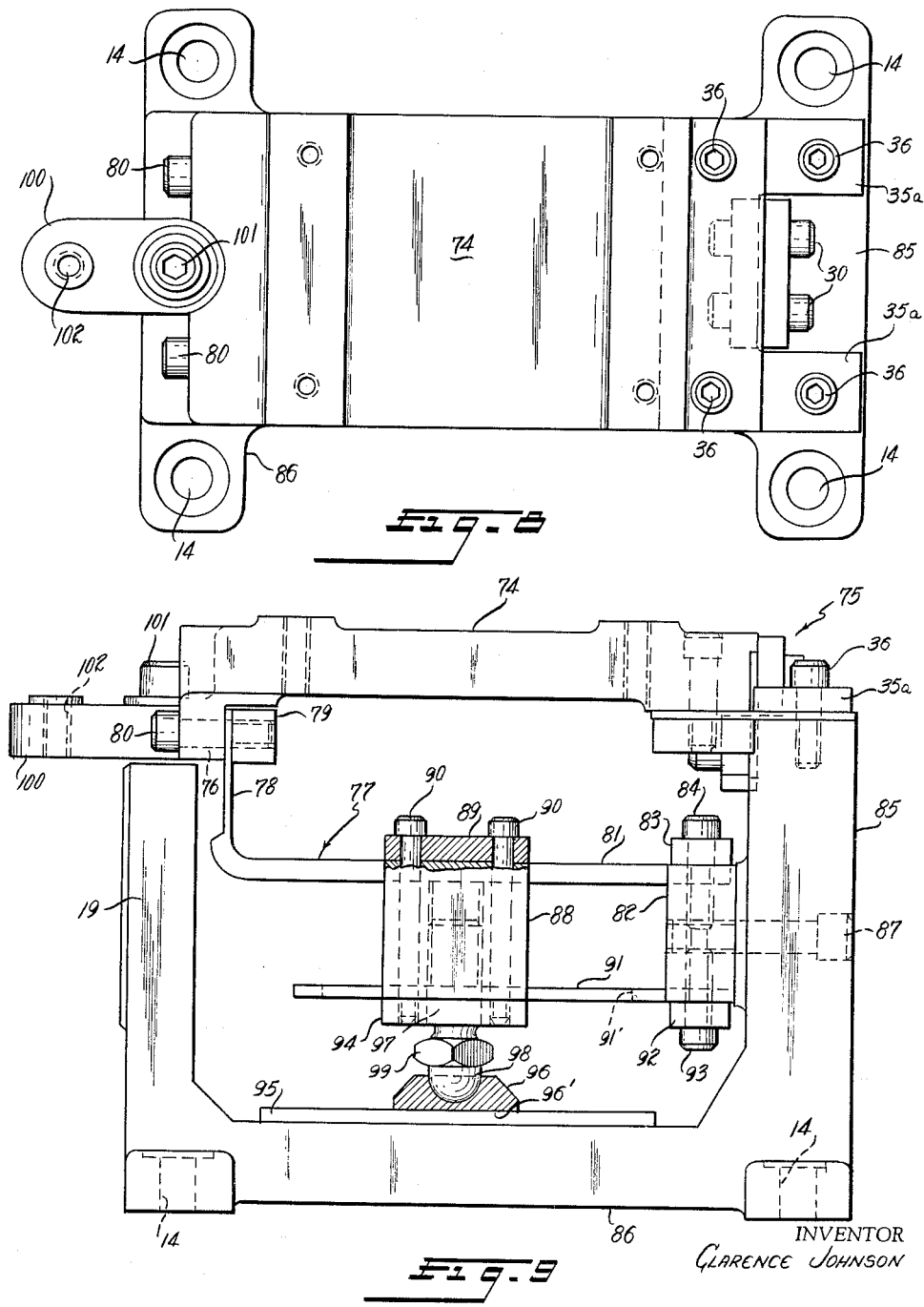

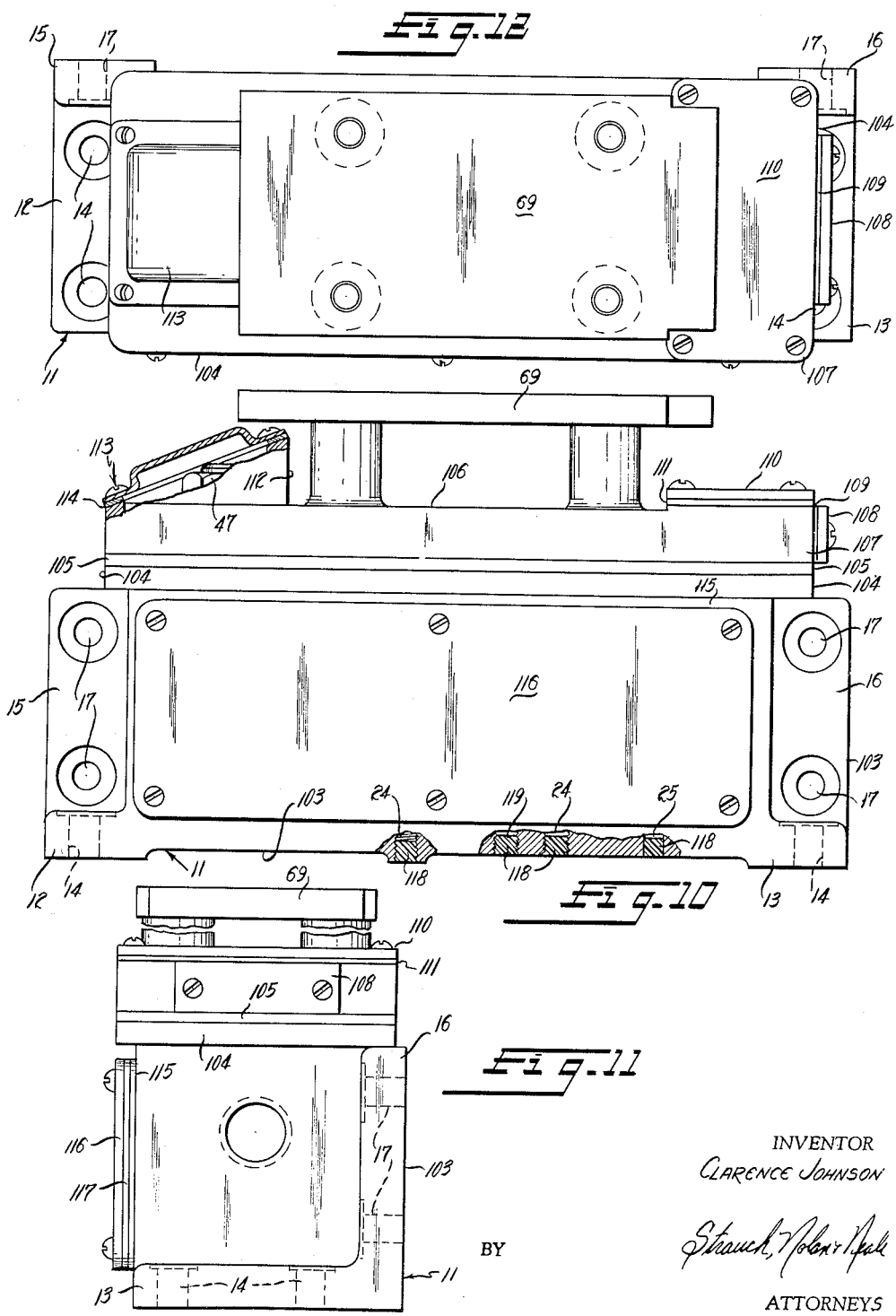

United States Patent Office 2,981,100
Patented Apr. 25, 1961

2,981,100

FORCE MEASURING INSTRUMENT

Clarence Johnson, 1804 Green Road,
South Euclid 21, Ohio

Filed Dec. 12, 1956, Ser. No. 627,776

17 Claims. (Cl. 73—141)

The present invention relates to force measuring devices or weighing machines adapted for measuring mechanical force, weight, tension or other measurable quantities by equipment sensitive to mechanical force or weight and capable of utilizing the measured value to give a visual reading or provide a control factor.

More particularly, the invention relates to a new and improved mechanical force measuring device useful for instrumentation in control systems or for providing remote indication of forces acting on the instrument. The instrument is sensitive to mechanically applied forces with the control or indication functions being effected in cooperation with electrical or other data transmission means of the known type. Such devices are used in many ways in modern technology. Increasing uses for the type of instrument to which the present invention relates are in the field of automation, i.e. continuous weighing, such as materials on a belt conveyor passing over a set of pulleys mounted on a scale platform, batch weighings of material dumped in a hopper to control cut offs such as a control gate or flow controller to a hopper. In automation, as in other fields, accuracy of control depends upon accuracy of measurement and, as will be hereinafter apparent, the instant invention provides an extremely accurate device for use with automatic control circuits and equipment, such as in the field of automation, where the slow speed of response of conventional weighing instruments causes such mechanism to be always trying to catch up to conditions existing prior to the recording function of the mechanism.

Many measuring or sensing devices have been developed for use in remote indication or in control circuits for equipment such as is used in automation. However, instrumentation of this type, adapted for use in force measuring is often found to be subject to undesirable response characteristics, due to the nature of the construction thereof, for example, the prior art usage of sliding weights on a beam or yard, pendulums having natural frequencies measured in seconds as compounded to the 200 cycle per second frequencies of the flexure pivot mechanism of this invention. Further, in use, the prior known devices are often found to be subject to inaccuracy. Usually the inaccuracy increases during use. Further, the prior known equipment, in many instances, embodies apparatus in which there are frictional components to be dealt with. Hysteresis losses are also a problem and the measuring equipment often introduces backlash and inertia problems. These undesirable quantities, introduced by these prior known devices into the indication of the measured quantity or the operation of the controlled equipment as the case may be, often increase with the use of the instrumentation. In other words, as is well known in the art, measuring equipment often creates its own problems insofar as accuracy of measurement or control is concerned. Furthermore, much of the instrumentation heretofore used is very delicate in comparison to the equipment with which it may be used, and a short life is normally to be expected therefrom.

Maintenance is another critical factor in automatic machinery. Usually a scale of any type will have a number of knife edges for bearings. These tend to deteriorate under the hammering that they get from automatic operation or become clogged by foreign materials. Knife edges must operate in only one position since they are loose joints. The platform that they support cannot, therefore, be guided by the knife edges. In special machines this imposes a problem since the construction must be such that the knife edges cannot be knocked off their seats.

According to the instant invention use is made of flexure pivots in providing a force measuring device useful for instrumentation or control purposes. Through the use of such pivots a simple, frictionless, hysteresis and lost motion free, method of rigidly hinging and connecting the movable weighing platform in two cardinal planes while flexibly supporting it in the third plane is provided so the relative movement of the parts can reliably be utilized as the measuring quantity. The flexure pivots provide a simple endurable method of resisting side and end forces acting on the platform without affecting its sensitivity to forces applied to the support face. Relative movement, in the instant case limited arcuate, occurs as the flexure pivots deform under the latter forces. With the use of such pivotal connections and suitable coupled measuring means, such as differential transformers, air gauges, crystals, strain gauges, etc., movements of the platform of the order of one millionth of an inch below the yield point of the material of the flexure pivots, can be accurately measured. As a consequence, the flexure pivots can be made quite heavy to eliminate the problems of maintenance while eliminating measurement inaccuracies due to lost motion, foreign materials, hysteresis, backlash and inertia. Furthermore, the initial accuracy can be retained indefinitely.

Flexure pivot type construction involves the utilization of the elastic deformation of materials. Control functions or indications are correlated with the amount of deformation produced by the quantity which is to be measured.

Apparatus has heretofore been developed utilizing some of the principles of elastic deformation in instrumentation. Examples of such prior developments are illustrated in United States Letters Patent to Johnson, 2,079,069, dated May 4, 1937; Pigott, 2,084,623, dated June 22, 1937; Spitzglass et al., 2,090,160, dated August 17, 1937; Barnes, 2,184,163, dated December 19, 1939; and Clark, 2,270,111, dated October 11, 1955.

These prior structures, however, fail to fully meet the requirements for the type of instrumentation which is needed in the field of automation. Automation requires equipment which is extremely reliable, which is not subject to damage, which is easy to adjust and provides a wide range adaptable for many purposes together with a long life. A satisfactory combination of such feature is not obtainable in the devices heretofore proposed.

One of the problems confronting the designer of instrumentation, for use in automation for example, is to provide an instrument in which injury will not readily occur, yet which will have an adequate range and a high sensitivity for the accurate and continuous monitoring of the quantity to be measured. Dash pots and other similar devices, such as friction means, have often been employed in prior art instruments to offer a means of protection or compensation for achieving suitable accuracy and range. These expedients, however, increase the complexity of the instrumentation and often are detrimental to accuracy and long operating life free from trouble.

A principal object of the instant invention, therefore, is to provide a force measuring device suitable for the intended purposes set out above, wherein the stresses to which the instrument will be subjected can not result in damage to the equipment through use of limiting means which under normal conditions is inoperative and, therefore, does not interfere with the accuracy of the instrument.

Another important object of the present invention is to provide a force measuring instrument designed and arranged so that the elastic limits of the materials involved will never be exceeded and, yet, the utilization of the elastic properties of material alone is at all times used to give a sensitive and highly accurate instrument.

Still another object of the instant invention resides in the provision of adjusting mechanism which is easy to use but yet which will not prejudicially affect the sensitivity and performance of the instrument.

Frequently, zero adjusting equipment or means provided on an instrument is unsatisfactory because it is either too rough or too sensitive or will shift and accuracy of adjustment is rendered difficult. A further object of the instant invention is to provide a zero adjusting means which is extremely accurate and readily accessible and, yet, with which a micrometer like adjustment can be obtained without difficulty.

Another object of the invention is to provide a zero adjusting mechanism embodying screw means which can be readily adjusted by normal equipment, yet which provides extreme accuracy, stability and reliability.

A still further object of the invention is to provide a zero adjusting means embodying a differential mechanism by means of which a micrometer final adjustment of the instrument can be obtained.

Many of the prior known instruments or devices used for force measurements, such as in remote indication or in automation, suffer from the disadvantage of being limited in the range of measurement which can be accommodated. As a result, it is often necessary to buy a number of instruments to encompass a relatively short range of measurement. This, of course, not only increases the cost of instrumentation, but also results in manufacturing difficulties not encountered where relatively few instruments can be used for a relatively wide range of measurement. According to the instant invention, a further important object is to provide a force measuring device which affords a wide range choice.

A still further object of the invention is to provide a force measuring instrument having a variable range and easy and effective means for range adjustment.

Still another object of the invention is to provide a range adjustment which embodies both a coarse and a fine adjustment making it possible to more accurately and properly adjust the instrument to a selected performance range.

The adjusting means provided in many instrument devices are often a factor in the accuracy of the device and affect the readings or indications which are obtained. An additional object of the instant invention is to provide an instrument of the type set forth above having both zero and range adjusting means exhibiting a minimum effect on the instrument insofar as its accuracy or performance is concerned.

Many instruments embodying a range and zero adjusting means are difficult to adjust because the zero and range adjusting means affect one another either by adding to or subtracting from the independently effected settings. This affects the operation and adjustment of the instrument and particularly makes it difficult to adjust the instrument. Accordingly, another object of the invention is to provide zero adjustment and range adjustment means which are actively correlated to result in adjustment being made at 90 degrees to each other to thus reduce and minimize the effect of one adjustment on the other.

A further object of this invention is to provide a force measuring device embodying a flexure pivot construction in which the arrangement of the pivots in not critical insofar as the accuracy and performance of the instrument are concerned.

An additional object of the invention is to provide a force measuring instrument with a platform supported at one end by flexure pivot means having right angularly related lateral force resisting components and provided at the other end with limit means preventing damage to the flexure pivot construction or to the platform.

A still further object of the invention is to provide apparatus as in the last mentioned object in which there is a point-like contact between the platform and the limiting means, thus eliminating the effects non-parallelism between the flexure pivot connection and the limiting means may have.

Yet another object of this invention is to provide a force measuring instrument embodying movable elements and a base structure in which the limits of the range of use of the device are governed solely by the strength of the base structure.

Another object of the instant invention is to provide a flexure pivot type force measuring instrument embodying a flexure pivoted or suspended platform adapted to receive a force, a range regulating device in the form of a flat cantilever spring, and a zero adjusting means interconnecting the platform and range regulating device embodying a flexure pivot construction to accommodate out-of-line positioning of the opposite ends of the zero adjusting means.

It is a further object of this invention to provide a force measuring instrument having flexure pivot means pivotally connecting a movable platform to a support base with a single clamp plate structure spanning the laterally spaced flexure pivot connections and eliminating the need for dowel pins used in the double clamp plate structures heretofore used in flexure pivot instruments.

Still another object of this invention is to provide a flexure pivot force measuring machine constructed as set forth in the foregoing objects which is waterproof and in which the operating mechanism will not be subject to the harmful effects of water or other fluid even if immersed.

A still further object of this invention is to provide a flexure pivot force measuring instrument embodying a movable platform and a fixed base and waterproofing means connecting the platform and the base which does not affect the quality of the operation of the instrument.

Further objects will appear from the following description when read in conjunction with the appended claims and the accompanying drawings wherein:

Figure 1 is a top plan view of a preferred form of force measuring instrument constructed in accordance with this invention;

Figure 2 is a front elevational view of the instrument of Figure 1 with parts broken away and sectioned to show the construction more clearly;

Figure 3 is an end elevational view of the instrument of Figure 1;

Figure 4 is an end elevational view of the instrument of Figure 1 viewed from the end opposite that shown in Figure 3;

Figure 5 is a sectional plan view taken along line 5—5 of Figure 2;

Figure 6 is a sectional elevational view taken along line 6—6 of Figure 2;

Figure 7 is a fragmentary front elevational view showing a different form of leaf spring mounting;

Figure 8 is a top plan view of another form of force measuring instrument constructed in accordance with this invention;

Figure 9 is a front elevational view of the form of the invention shown in Figure 8;

Figure 10 is a front elevational view, with elements broken away to improve the showing, illustrating a waterproofed force measuring instrument constructed in accordance with this invention;

Figure 11 is an end elevational view of the instrument of Figure 10; and

Figure 12 is a top plan view of the instrument of Figure 10.

With continued reference to the drawings wherein like parts throughout the several figures are identified by the same reference numeral, a preferred weighing or force measuring instrument 10 constructed in accordance with the instant invention icludes a base 11 which constitutes a support frame for the operating components. Base 11, preferably formed as a casting of adequate thickness to provide a secure fixed support, is provided with bottom flanges 12 and 13 having laterally spaced openings 14 adapted to receive mounting bolts for mounting the instrument in a vertical position. The base is also provided with vertically extending mounting flanges 15 and 16 having vertically spaced openings 17 to alternately receive mounting bolts for side mounting of the base. The base can be mounted in any position, as will be apparent hereafter, due to the fact that the functioning parts of the instrument will operate irrespective of the position in which the base 11 is supported. Thus, the base can be mounted with its bottom 18 at any angle, either completely upside down, or at any oblique angle.

Base 11 includes upstanding support walls 19 and 20 adjacent its opposite ends which form with the bottom wall 18 a well or chamber 21. Chamber 21 is open at its sides and bottom wall 18 is stepped to provide a raised planar portion or ledge 22 of elongated form bounded along one end by a laterally extending planar support ledge 23 paralleling ledge 22. Base 11 in the area of ledge 22 is provided with a series of laterally aligned, longitudinally spaced threaded openings 24 extending from ledge 22 through the bottom face of wall 18 and an opening 25 extending from ledge 23 through the bottom of wall 18. Openings 24 are provided in laterally aligned pairs extending along the side edges of ledge 22 whereas the opening 25 is positioned substantially along the longitudinal center line between the pairs of aligned openings 24.

A platform 26 extends in top covering relation to the well or chamber 21 and is resiliently supported from but itself does not contact the support wall 20 which is slightly less height than wall 19. The method of supporting the platform in the preferred embodiment of the invention comprises flexure pivot means consisting of the flexure plates 27 and 28 arranged in right angularly disposed relation. Plate 27 lies in a vertical plane and is secured to platform 26 by means of a clamp or backing plate 29 and set screws 30 and is secured in a notch formed in the inner face of flange 20 at its upper end by backing plate 31 and set screws 32.

Flexure plate 28 is of U-shaped configuration in plan and is secured through its main body portion to platform 26 by backing plate 33 and set screws 34. The free ends of the legs of plate 28 receive plate 27 therebetween and are secured to flange 20 by clamp or backing plate 35 and set screws 36. Plate 35, like plate 33, is U-shaped to accommodate plates 27 and 29 and screws 30. The flexure plates 27 and 28 form a pivot connection having an axis approximately at 37 extending laterally of platform 26. The dimensions and material requirements of flexure plates are selected in light of the value of the forces to be measured to provide a deflection range of the order of .005 of an inch and assure that the maximum and minimum deflecting forces to be encountered in use will fall within the elastic limits of the material. Due to the right angular relation of the flexure plates 27 and 28 and their substantial lateral dimensions and firm clamped connections to platform and support wall 20, platform 26 is constrained against lateral movement but is free for pivotal movement around axis 37 to the extent permitted by the elastic limits of the material of which plates 27 and 28 are made.

Platform 26 extends, from its flexure pivot mounting, over to and above flange 19. The platform is provided in vertical alignment with flange 19 with a vertically extending longitudinally centrally positioned bore 38 counterbored as at 39. Flange 19 aligned with bore 38 is provided with a threaded opening 40. A minimum limit adjusting screw 41 having its shank loosely received in its enlarged head 42 in counterbore 39 threadedly engages in opening 40. Head 42 butts the bottom wall of counterbore 39 to limit the upward movement of platform 26 and the thickness of the platform 26 is such that the bottom face thereof surrounding bore 38 clears the upper end of base wall 19.

Platform 26 is provided with a second longitudinally centered threaded bore 43 adjacent and longitudinally inwardly of counterbore 39. An externally threaded sleeve 44 is threadingly engaged with the bore 43. Sleeve 44 has a hexagonal head 45 to provide a convenient means of threadedly adjusting the position of sleeve 44 within bore 43 and is provided with a longitudinally extending threaded bore 46 adapted to threadingly cooperate with the upper end of a double ended stud 47. The lower end of stud 47 extends downwardly through chamber 21 and is connected to the free end of a flat range adjustment spring 48 by means of connecting nuts and end washers 49 and 50 mounted on stud 47 at opposite sides of the spring 48. The stud 47 extends freely through a suitable opening in spring 48. Spring 48 is provided with a laterally centered opening 51 adjacent its opposite end (in the position in which the spring is shown in the drawings) in alignment with opening 25 in ledge 23 of base 11. Opening 51 is substantially the same size as opening 25 and a roll pin 52 frictionally engaged in both openings 25 and 51 fixes the opopsite end of spring 48 against relative movement laterally and longitudinally of ledge 23.

Spring 48, as clearly seen in Figure 2 spans ledge 22 between ledge 23 and its connection to stud 47 and abuttingly engages the opposed faces of a pair of flat slide blocks 53 and 54 which are slidably positioned in a downwardly opening recess 56 provided in a clamp block 55. Clamp block 55 extends laterally beyond slide blocks 53 and 54 and spring 48 at both sides and is adapted to clampingly couple the slide block and spring in longitudinal adjusted position by four set screws 57. The latter threadingly engage preselected pairs of the laterally spaced holes 24 in base 11. The base is provided as illustrated with five sets of holes 24 spaced longitudinally along ledge 22. These are spaced in conformity with the spacing of the screws 57 in block 55. By this means the clamp block 55 can be moved toward or away from pin 52, thus providing a rough adjustment of the free length of spring 48. Relative longitudinal movement of slide blocks 53 and 54 with respect to loosened clamp block 55 enables a finer adjustment of the free spring length, i.e., the distance between the slide blocks 53, 54 and the nuts 49 and 50. Thus a coarse and a fine adjustment of the free length of spring 48 is conveniently provided.

Stud 47 has two sets of opposed, crescent shaped, laterally extending notches 58 and 59 milled therein to provide relatively thin, laterally directed, longitudinally spaced central webs 60 located inwardly of platform 26 and inwardly of spring 48. These webs form flexure pivots permitting the shank of stud 47 to bend between its threaded ends to accommodate misalignment between the end in platform 26 and the end in spring 48. This misalignment is thus permitted without introducing undesirable frictional resistance to movement of platform 26 and spring 48 while assuring a longitudinally rigid connection between the members 26 and 48 and eliminating any ill effect on the measuring or detecting operation that might otherwise occur. This structure also provides adequate torsional rigidity for lengthwise adjustment of the stud 47 relative to the platform 26 and spring 48 by means of rotation of sleeve 44.

In the illustrated embodiment, sleeve 44 has an external thread having 10 threads per inch and an internal thread having 20 threads per inch. The net effect of this differential threading is to advance the adjusting stud 47 .050 inch per revolution of sleeve 44. This differential structure provides a means for effecting an accurate micrometer zeroing adjustment. Obviously a different thread ratio can be used than that employed in the described embodiment.

From the above description, it will be apparent that a load applied to platform 26 will cause deflection of the flexure pivots 27 and 28 and spring 48 in proportion to the downward force of the load on platform 26. This deflection is limited by contact of the portion of platform 26 surrounding base 38 with the flange 19 or preferably a limit washer 61 secured in position on flange 19 by screw 41 to form in effect a point limit contact. Due to the positioning of zero adjusting stud 47 and the limit screw 41 along the longitudinal center of platform 26, an effective three point contact between platform 26 and base 11 is provided eliminating the need for close tolerance machining of the bottom of the platform 26 and the top surfaces of walls 19 and 20. Further, if the hinge axis 37 is slightly off of horizontal, no harm will result since the clearance between platform 26 and the top surface of wall 19 is sufficient to compensate for reasonable variations in axis 37.

The movement of the platform 26 in the form of the invention illustrated in Figures 1 through 6 of the drawings is converted into electrical signals by means of a differential transformer 62 and transmitted to a suitable indicator or recorder. Transformer 62 is supported on flange 19 by spaced connecting bolts 63 which cooperate with spacer sleeves 64 in mounting the transformer on the inner face of flange 19 spaced therefrom a sufficient distance to clear stud 47. The transformer armature 65 is connected to platform 26 by means of a screw 66 connected to the armature. Screw 66 is threadedly received in a suitable counterbored opening in platform 26 and secured therein by a lock nut 67 which secures the armature in its zero indicating position with respect to platform 26.

Flange 20 is provided with a threaded opening 68 for the connection of fluid conduits, etc., which may be used with air type sensing means when the latter are employed in place of transformer 62.

Platform 26 is illustrated as a support for a spacer block 69 connected to the platform by means of spaced screws 70. The spacer block may support a pillow block journalling a roller, for example, which could support a run of a conveyor belt, the tension of which is to be measured. It will be appreciated that any other means of transmitting a force to the platform 26 may be employed depending upon the use desired to be made of the force measuring instrument of the present invention. For example, strain gages, air gages, and enumerable other devices may be connected to the platform for data transmission purposes.

Adjustment of the measuring instrument is effected by alternate adjustment of the effective length of spring 48 by shifting of blocks 53, 54 and 55 and limit adjustment screw 41. The first step consists in applying weights equivalent to the minimum expected force to spacer block 69 and backing off screw 41 to permit platform 26 to assume its maximum upward position. Additional weights are then applied to secure a force equivalent to the maximum expected force to be measured. This forces platform 26 downwardly seating its free end on washer 61, flexing of plates 27 and 28 permitting this movement. Screws 57 are then loosened and slide blocks 53 and 54 are moved back or forth as required to shorten and stiffen the resistance of spring 48 or lengthen and lessen the resistance of spring 48 until the downward limit of platform 26 with the maximum force applied thereto is just sufficient to cause a firm bearing on washer 61. The additional weights are then removed from spacer block 69 leaving the minimum weights in place. If the upward movement is too great or too little to seat head 42 of screw 41 on the bottom wall of counterbore 39 adjustment screw 41 is again adjusted to properly establish the upward limit of platform 26 and the zero position of the platform. Thus the range of movement of platform 26 and its zero position for the anticipated job is easily established. The indicator or recorder is then checked and, if it fails to indicate zero, lock nut 67 is loosened and screw 66 is turned in the appropriate direction to raise or lower armature 62 to bring the indicator or recorder to its zero point thus calibrating the entire system for the anticipated job.

In event the flexure plates 27 and 28 or spring 48 are too stiff or too limber for the anticipated job thicker or thinner plates and a thicker or thinner spring as required may be substituted and adjusted and calibrated as just described. It being known that the flexibility of flexure plates 27 and 28 and spring 48 vary inversely as the cube of their thickness and directly as the cube of their effective length, it is possible to readily build a force measuring instrument in accord with the teachings of this invention to meet any anticipated conditions with extreme accuracy. It should further be noted that the present invention employs flexure plates of minimum effective length and that, therefore, the flexure plate variations are for all practical purposes dependent upon their thickness alone.

Figure 7, wherein the same reference numerals are employed for the same elements and numerals followed by the letter "a" are employed to indicate corresponding elements involving minor variations, illustrates a modified form of the invention. In this embodiment, a range spring 48a is fixedly and non-adjustably mounted on ledge 22a by screws 57. As a consequence, this form does not embody any range adjustment. However, since all other features of the embodiment of Figures 1 through 6 are present, this embodiment is ideally suited for usage where a predetermined constant range variation is anticipated and where expense and likelihood of careless or inexpert operators are factors to be considered by the user.

Still another embodiment is illustrated in Figures 8 and 9 where, due to the wider variations in construction, different numerals are employed. In this form, both the range and zero adjustment are provided by a sliding block carried by the range adjustment spring. In this form of the invention, the platform 74 is mounted adjacent one end by flexure pivot means indicated at 75 similar to that heretofore described but employing spaced segmental clamp blocks 35a in lieu of the single clamp block 35 of the previous embodiments. At the opposite end, platform 74 is provided with a depending flange 76. A flat spring element 77, which has a thinned, vertically extending leg 78 clampingly secured to depending flange 76 by means of a suitable clamp block 79 and spaced screws 80 to form a flexure pivot connection therewith, has its right angularly related, thickened and elongated body 81 anchored at its free end to an end of a connector block 82 by means of a clamp plate 83 and laterally spaced securing screws 84. Block 82 is in turn connected to a laterally and vertically extending land on wall 85 of base 86 by laterally spaced screws 87 passing through wall 85 and threaded into block 82. Block 82 at its other end mounts one end of a second flat spring element 91, which extends away from wall 85 parallel to and vertically spaced beneath body 81 of spring element 77. Clamp block 92 and laterally spaced screws 93 are employed to connect plate 91 to block 82. A spacer block 88 is notched at its opposite ends to slidingly receive body 81 of spring element 77 and the protruding portion of spring element 91, which is longitudinally slotted as indicated by numeral 91' for a purpose to be presently pointed out. Spacer block 88 is adapted to be fixedly located longitudinally of body 81 of spring elements 77 and 91 by clamp blocks 89 and 94 and laterally spaced pairs of screws 90 which pass freely through suitable openings in block 89 and block 88 spaced laterally outwardly of the longitudinal edges of spring elements 77 and 91 and thread into suitably located and tapped apertures in plate 94. In this way the spring elements 77 and 91 are connected together so that element 91 serves to dampen or stabilize the flexing action of element 77, the effective length of which is varied to establish the range of the instrument by loosening of screws 90 and moving block 88 and its clamp plates back and forth as required.

Zeroing of the instrument is effected by the following structure associated with block 88 and base 86. To begin with base 86 is provided with a machined land or ledge 95. A slide block 96 having a machined slide surface 96' formed on its under side and a spherical socket in its upper face is disposed with its face 96' bearing on the machined surface of land 95. The spherical socket receives the mating spherical dome head 98 of an adjusting or zeroing screw 97, the shank of which is threadedly received in a centered tapped bore in block 88 aligned with slot 91' of spring element 91 and passes freely through slot 91'. Between head 98 and block 94, zeroing screw 97 is provided with a hexagon shaped wrench portion 99 adapting screw 97 for ready inward or outward threading to establish the uppermost or zero position of platform 74 by reason of the bearing engagement of slide block 96 on land 95, head 98 in the spherical socket of block 96 and the unitary bodily movement of spring element plate 91, block 88, spring element 77 and platform 74 as screw 97 threads in and out of block 88.

Platform 74 has a longitudinal projecting flange 100 carried by flange 76. A limit screw 101 is mounted in this flange 100 to provide one point contact with base wall 19 to prevent over flexing of the instrument. Further, the flange is provided with a threaded opening 102 which can be used to connect to a device such as the differential transformer of Figure 2 for operating a suitable indicator or recorder.

It is seen that with the form of instrument illustrated in Figures 8 and 9 the zero and range adjustment are provided through the sliding block 88 and its related parts.

Referring now to Figures 10 through 12, there is illustrated a flexure pivot force measuring device constructed in accordance with the invention which is waterproof and not subject to the deleterious effects of water or other fluid or foreign matter of any kind. The apparatus illustrated in Figures 10 through 12 is substantially identical with that illustrated in Figures 1 through 6 with the exception of the waterproofing construction. Accordingly, in the following description the emphasis is on the structure which is different from that previously described.

Referring to the upper right hand corner of Figure 10, and to Figures 11 and 12, it is seen that the base casting 13 is provided with a ledge or rim 104 which extends completely around the upper portion of the base casting. A thick, easily compressible sponge rubber or similar gasket 105 is disposed on the upper face of ledge 104 beneath the platform 106 and extends between the platform and the base ledge 104.

Further, the platform 106 is provided with a rim like member 107 which extends around the upper portions of the flexure pivot beam connections as seen in Figure 10, and rests on gasket 105 at this end of the instrument. Rim 107 has an access opening at its outer end which is adapted to be closed by a cover plate 108. A suitable gasket 109 is provided to seal this access opening and upper opening of the rim 107 is sealed by cover plate 110 and another suitable gasket 111.

Platform 106 is also provided at its opposite end with an upstanding longitudinally inclined opening defining wall 112, encircling the zero adjustment screw 47 and limit screw 38. The upper edge of the wall 112 is adapted to receive a cover plate 113 and a suitable gasket 114. The zero adjusting and limit screws are thus protected.

Base member 13 at its opposite longitudinal sides is further provided with cast side ledges 115 (Figure 11). These ledges are adapted to mount closer covers 116 and suitable gaskets 117 to close the sides of the base casting beneath the ledge 104. Each of the base openings 24, 25 and the openings for bolts 63 (Figure 1) are preferably provided with suitable non-metallic sealing plugs 118 (Figure 10).

There is thus provided a waterproofed force measuring device. It is obvious that any unused openings will also be plugged during the mounting of the machine.

The compressible gasket that fits between the ledges on platform 106 and base 103 being made of very soft sponge rubber or like material will not have sufficient resilience to noticeably affect the flexure pivots and adjusting mechanism. In other words, the resilient force applied by the gasket will be such as not to affect the desired performance of the instrument. Further this force is obviously of no importance in providing remote indication or control.

From the foregoing description it will be apparent that this invention has many advantages, among which are the fact that there is provided a force measuring machine having a considerable range and which is capable of accuracy of adjustment. Further there is provided a machine which is frictionless, which is long-lasting, and with which the accuracy will not be impaired through use. In addition there is provided a machine which is of relatively simple structure as compared with heretofore known machines utilized for similar purposes.

The invention may be embodied in other specific forms without departing from the spirit or essential characteristics thereof. The present embodiments are therefore to be considered in all forms as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A force measuring instrument comprising a base, a platform yieldingly pivotally connected to said base, means for resisting pivotal movement of said platform with respect to said base comprising a resilient member extending parallel to said platform, force transmission means comprising laterally disposed flexure pivot means positively interconnecting said resilient member and said platform, and means for adjustably fixing said resilient member to said base at varying distances from said force transmission means to vary the effective length of said resilient member so as to establish the operative range of said instrument.

2. A force measuring instrument comprising a base; a platform yieldingly pivotally mounted on said base; means for resisting pivotal movement of said platform with respect to said base comprising a flat spring elongated in a direction parallel to said platform; means adjustable along said flat spring for determining the effective length of said flat spring comprising clamping means adapted to be fixedly positioned to said base thereby clamping said spring to said base to establish a predetermined effective spring resistance and slide block means received in said clamping means for effecting incremental adjustment of said effective spring length; and force transmission means interconnecting said spring and said platform, the last named means including means for adjusting the length of said interconnecting means to establish the zero position of said platform.

3. A force measuring instrument comprising a base, a platform yieldingly pivotally connected to said base adjacent one end of said platform, the opposite end of said platform extending over a portion of said base and being movable toward and away therefrom upon pivotal movement of said platform in response to forces applied to said platform, means for limiting the pivotal movement of said platform comprising a limit screw connected to said base and effective to limit pivotal movement of said platform in one direction with respect to said base, and means resiliently resisting the pivotal movement of said platform in the opposite direction with respect to said base and establishing the upper limit of a measuring range for said yieldingly pivoted platform, said last named means comprising a resilient member fixedly held at one end, means connecting said platform to said resilient member comprising differential screw means adapted to adjust the length of the connection between said resilient member and said platform while remaining effective to transmit the resilient force of said resilient member to said platform, said differential screw means comprising a first member threadingly connected to said platform and a second member threadingly connected to said first member with the threaded connection between the second member and said first member having a different pitch from the threaded connection between said first member and said platform.

4. A force measuring instrument comprising a base, a platform yieldingly pivotally connected to said base for pivotal movement with respect to said base, leaf spring means for resiliently resisting said pivotal movement comprising a leaf spring member fixed at one end to said base and extending parallel to said platform for a substantial portion of its length, means adjustably fixedly connecting a portion of said leaf spring member inwardly from its free end to said base thereby varying the effective length of said spring and positive force transmission means directly connecting said free end of said leaf spring member to said platform.

5. A friction, hysteresis and lost motion free high frequency responsive force measuring instrument comprising a support base providing laterally spaced upstanding mounting formations; a platform for receiving a force to be measured; flexure plate means mounting one end of said platform on one of said mounting formations for bodily swinging movement around an axis extending laterally of said platform with its opposite end overhanging said other mounting formation; range determining means comprising cantilever spring means mounted on said support base and paralleling said platform with one end free; means for fixing said cantilever spring means at one of a series of longitudinally spaced points from said free end to said support base to vary the effective length and therefore the resistance force of said cantilever spring means; positive force transmission means directly connecting said free end of said cantilever spring means to said platform at a point longitudinally spaced from said mounted end of said platform; and limit means secured to said other mounting formation and cooperating with said platform to form means for predetermining the extent of movement of said platform in both directions around said lateral axis to confine the movement of said platform within the elastic limits of said flexure plate means.

6. A friction, hysteresis and lost motion free high frequency responsive force measuring instrument comprising a support base providing laterally spaced upstanding mounting formations; a platform for receiving a force to be measured; flexure plate means mounting one end of said platform on one of said mounting formations for bodily swinging movement around an axis extending laterally of said platform with its opposite end overhanging said other mounting formation; range determining means comprising cantilever spring means paralleling said platform with one end free and fixed at a longitudinally spaced point from said free end to said support base; direct positive force transmission means connecting said free end to said platform at a point longitudinally spaced from said mounted end of said platform, said direct positive transmission means comprising a longitudinally lost motion free force transmitting element connected at one end to said free end and at its other end to said platform and having a laterally extending relief intermediate its ends adapting said ends for limited relative lateral shifting movement in a planar direction paralleling said platform; and limit means secured to said other mounting formation and cooperating with said platform to form means for predetermining the extent of movement of said platform in both directions around said lateral axis to confine the movement of said platform within the elastic limits of said flexure plate means.

7. A force measuring instrument comprising a base; a platform having one end yieldingly pivotally connected to said base and the opposite end of said platform extending over a portion of said base and being free to move toward and away therefrom upon pivotal movement of said platform around said one end in response to forces applied to said platform, said opposite end having a through opening therein; means for limiting the pivotal movement of said platform comprising a headed limit screw threaded into said base in position for its shank to lie in said through opening and effectively cooperating with said base and platform to limit pivotal movement of said platform in opposite directions with respect to said base; variable length spring means having an end positively connected to said opposite end of said platform and adjustable means resisting movement of the other end of said spring means whereby said spring means resiliently resists the pivotal movement of said platform in response to an applied load and establishes the upper limit of a measuring range for said yieldingly pivoted platform.

8. A force measuring instrument comprising a base, a platform yieldingly pivotally connected to said base adjacent one end of said platform, the opposite end of said platform extending over a portion of said base and being movable toward and away therefrom upon pivotal movement of said platform in response to forces applied to said platform, means for limiting the pivotal movement of said platform comprising a headed limit screw connected to said base effectively cooperating with said platform to limit pivotal movement of said platform in opposite directions with respect to said base, and preselected interchangeable spring means having an end positively connected to said opposite end of said platform and means resisting movement of the other end of said spring means whereby said spring means resiliently resists the pivotal movement of said platform in response to an applied load and establishes the upper limit of a measuring range for said yieldingly pivoted platform, said spring means comprising an elongated resilient spring member and a force transmitting means connecting said resilient member to said platform in the form of a rod-like member adjustably fixedly connected to said platform and resilient member and having at least one laterally extending reduced thickness area between its ends forming a flexure pivot the axis of which extends laterally to permit relative shifting of the opposite ends connected to said platform and to said resilient member.

9. A force measuring instrument comprising a base, a platform yieldingly pivotally connected to said base adjacent one end of said platform, the opposite end of said platform extending over a portion of said base and being movable toward and away therefrom upon pivotal movement of said platform in response to forces applied to said platform, means for limiting the pivotal movement of said platform comprising a headed limit screw connected to said base effectively cooperating with said platform to limit pivotal movement of said platform in opposite directions with respect to said base, and variable length leaf spring means positively connected to said platform adjacent said opposite end of said platform and resiliently resisting the pivotal movement of said platform in response to an applied load and establishing the upper limit of a measuring range for said yieldingly pivoted platform, said variable length leaf spring means comprising a leaf spring, a sliding block slidably receiving said leaf spring and clamping means for fixing said block to said base in a selected longitudinal position relative to said leaf spring whereby sliding of said block adjusts the effective length of said leaf spring.

10. A force measuring instrument comprising a base, a platform yieldingly pivotally connected to said base adjacent one end of said platform, the opposite end of said platform extending over a portion of said base and being movable toward and away therefrom upon pivotal movement of said platform in response to forces applied to said platform, means for limiting the pivotal movement of said platform comprising a headed limit screw connected to said base effectively cooperating with said platform to limit pivotal movement of said platform in opposite directions with respect to said base, and leaf spring means positively connected to said platform adjacent said opposite end of said platform and resiliently resisting the pivotal movement of said platform in response to an applied load and establishing the upper limit of a measuring range for said yieldingly pivoted platform, said variable length leaf spring means comprising a leaf spring having one end disposed to be fixed to said base, means fixedly securing said one leaf spring end to said base with the main spring body extending parallel to said platform and positioned at one side thereof and non-yielding force transmitting means directly interconnecting the other end of said leaf spring and said platform for directly positively transmitting oppositely acting forces between said leaf spring and said platform during pivotal movement of said platform.

11. The instrument of claim 1 wherein said means for adjustably fixing said resilient member to said base at varying distances from said force transmission means comprises slide block means slidably engageable with a selected portion of said resilient member and an opposed portion of said base to predetermine the effective length of said resilient member; clamping means adapted to cooperate with said slide block means; and means for imparting a clamping force to said clamping means in any selected position of said slide block means and said clamping means to selectively fix said portion of said resilient member to said base.

12. The instrument of claim 6 wherein the connection of said direct positive force transmission means to said platform means comprises screw means adapted to adjust the length of the interconnection thereby enabling a zeroing adjustment to be made without disturbing the previously established range adjustment.

13. The instrument of claim 5 wherein the flexure plate means mounting said one end of said platform comprises a pair of metal plates arranged in cruciform fashion with the opposite ends of each plate apertured at laterally spaced points and one of said plates centrally notched in from one end to straddle the other plate adapting said plates for bolted connection to the platform end and said one mounting formation with the platform end and said one mounting formation disposed in diagonally related dihedrals of the flexure plate means.

14. The instrument of claim 8 wherein said resilient spring member is fixedly connected at one end to said base.

15. A force measuring instrument comprising a base, a platform yieldingly pivotally connected to said base, means for resisting pivotal movement of said platform with respect to said base comprising a resilient member extending parallel to said platform, force transmission means comprising laterally disposed flexure pivot means positively interconnecting said resilient member and said platform, and means for adjustably fixing said resilient member to said base at varying distances from said force transmission means to vary the effective length of said resilient member operative to establish the operative range of said instrument, and force sensing means interconnected with said force measuring instrument adapted to sense a deflection of said platform and convert it into an output signal.

16. A force measuring instrument comprising a base, a platform yieldingly pivotally connected to said base for pivotal movement with respect to said base, leaf spring means for resiliently resisting said pivotal movement comprising a leaf spring member fixed at one end to said base and extending parallel to said platform for a substantial portion of its length, means adjustably fixedly connecting a portion of said leaf spring member inwardly from its free end to said base and positive force transmission means directly connecting said free end of said leaf spring member to said platform, and force sensing means cooperating with said force measuring instrument including a differential transformer adapted to sense a deflection of said platform and convert it into an electrical output signal.

17. A force measuring instrument comprising a base, a platform yieldingly pivotally connected to said base for pivotal movement with respect to said base, preselected interchangeable spring means for resiliently resisting said pivotal movement comprising an elongated spring member fixed at one end to said base and extending parallel to said platform for a substantial portion of its length, means fixedly connecting a portion of said elongated spring member inwardly from its free end to said base and positive force transmission means directly connecting said free end of said elongated spring member to said platform.

References Cited in the file of this patent

UNITED STATES PATENTS

| | | |
|---|---|---|
| 2,025,928 | Wunsch et al. | Dec. 31, 1935 |
| 2,244,621 | Hurt | June 3, 1941 |
| 2,472,545 | Nixon | June 7, 1949 |
| 2,561,318 | Ruge | July 17, 1951 |
| 2,598,812 | Marco et al. | June 3, 1952 |
| 2,709,790 | Swanson | May 31, 1955 |
| 2,720,111 | Clark | Oct. 11, 1955 |
| 2,786,669 | Safford et al. | Mar. 26, 1957 |

FOREIGN PATENTS

| | | |
|---|---|---|
| 725,926 | Great Britain | Mar. 9, 1955 |